April 21, 1964 W. J. DOWDAKIN 3,129,614
TOOL GUIDE
Filed Dec. 22, 1961
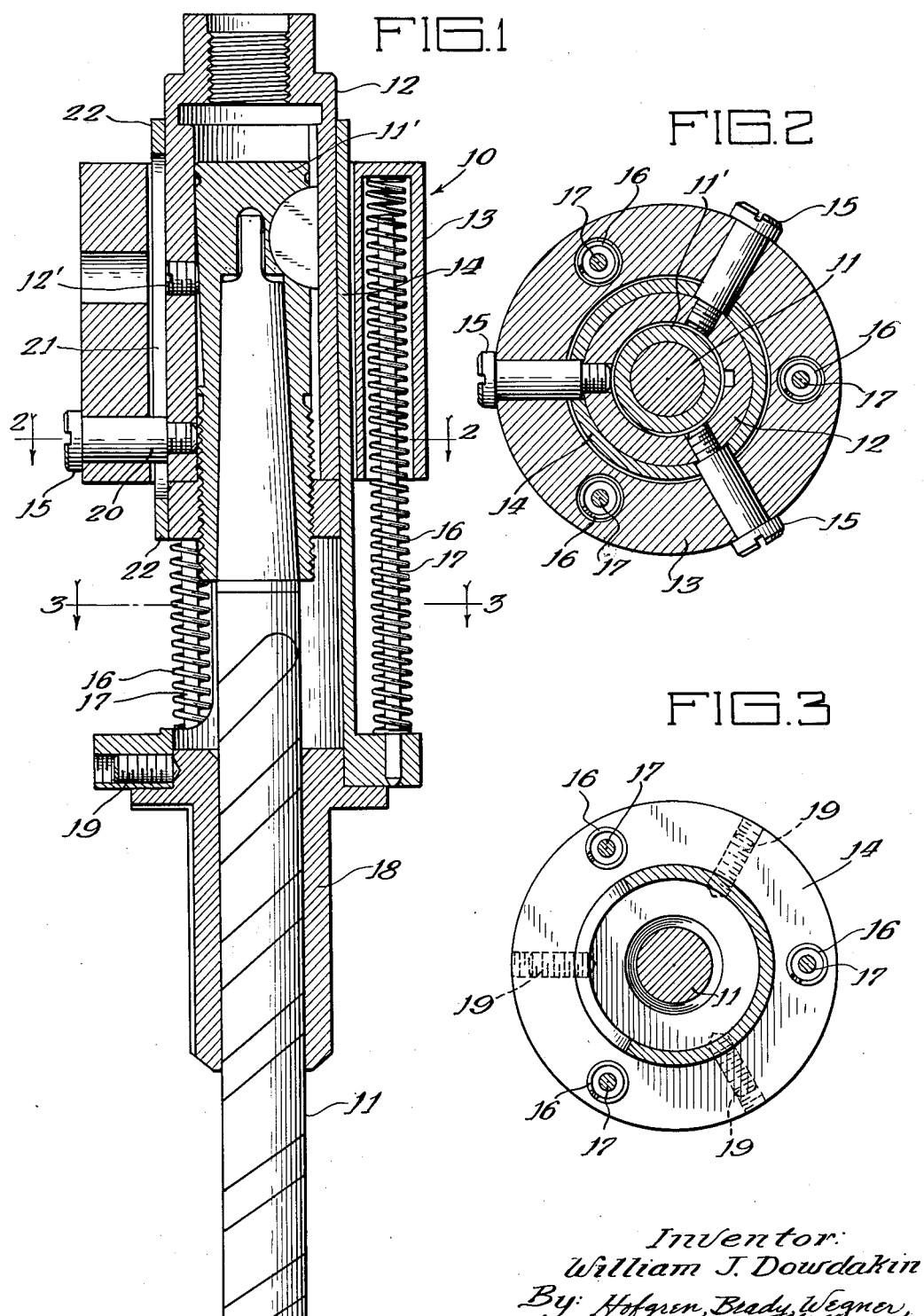
Inventor:
William J. Dowdakin
By: Hofgren, Brady, Wegner,
Allen & Stellman
Attorneys

United States Patent Office 3,129,614
Patented Apr. 21, 1964

3,129,614
TOOL GUIDE
William J. Dowdakin, Rockford, Ill., assignor to Sundstrand Corporation, a corporation of Illinois
Filed Dec. 22, 1961, Ser. No. 161,655
5 Claims. (Cl. 77—55)

This invention relates to tool guides and more particularly to a new and improved retractable tool guide and bushing which rotates with the tool.

A frequently encountered problem in high precision work is in the method of supporting a tool while performing a work operation. In order to obtain true and accurate work, it has been found necessary to support the tool along as much of its length as possible to prevent vibrating or "wobbling" as the tool operates.

It is therefore an object of the present invention to provide a new and improved tool guide which supports the tool the full length of the tool stroke.

Another object of this invention is to provide a rotating tool guide and bushing so as to minimize internal wear on the guide by the tool as the tool is fed through said guide.

Still another object of this invention is to provide a spring biased tool guide which is downwardly urged by said spring to cover the tool when said tool is not in the work, said tool guide resting in its down position until it is retracted with the tool.

A still further object of this invention is to provide a tool guide which properly supports the tool, is economically feasible to assemble, and is long lasting and wear resistant.

Other objects and advantages will become readily apparent from the following detailed description taken in connection with the accompanying drawing, in which:

FIGURE 1 is a vertical section of the invention showing the tool in its down, or "unsheathed" position;

FIGURE 2 is a horizontal section taken in the direction of the arrows at line 2—2 in FIGURE 1; and FIGURE 3 is another horizontal section taken in the direction of the arrows at line 3—3 in FIGURE 1.

While an illustrative embodiment of the invention is shown in the drawing and will be described in detail herein, the invention is susceptible of embodiment in many different forms, and it should be understod that the present disclosure is to be considered as an exemplification of the principles of the invention and is not intended to limit the invention to the embodiment illustrated. The scope of the invention will be pointed out in the appended claims.

Referring now to the drawing, a tool guide assembly 10 is shown in working arrangement with a tool 11 and a driving spindle 12. The driving spindle 12 may be attached to various work machines (not shown) such as; drill presses, turret lathes, etc. in a manner well known in the art.

The tool 11 is held in the driving spindle 12 by a quick lock adaptor 11' and affixed firmly to the driving spindle 12 by set screw 12' as is customary in the art. Thus when the work machine is started, the drive spindle and tool will rotate.

The tool guide assembly 10 includes a spring retaining block 13 having a guide bushing retainer 14 movably mounted therein. The spring retaining block 13 is securely affixed to the drive spindle 12 with a plurality of shoulder screws 15 (three in the present embodiment) and when the drive spindle rotates, the spring retaining block 13 also rotates. The shoulder screws 15 also serve as limit stops and rotating means for the guide bushing retainer 14 as will be hereinafter described.

Three 120° spaced springs 16 and spring guide pins 17 are disposed between the spring retaining block 13 and the guide bushing retainer 14, and urge the guide bushing retainer to its full "sheathing" or downward position around the tool 11.

A tool guide bushing 18 is affixed to the lower edge of the guide bushing retainer 14 with set screws 19. It is this tool guide bushing 18 which supports the part of the tool 11 out of the work.

In operation, the tool guide assembly functions to support the tool in the following way. At the beginning of the work stroke, the tool 11 is fully sheathed in the tool guide assembly 10 and bushing 18 and the entire tool guide assembly and tool are rotating with the drive spindle 12.

The screws 15 hold the spring retaining block 13 securely to the drive spindle 12 and also rotate the guide bushing retainer 14. The movement of the guide bushing retainer 14 relative to the drive spindle 12 and the spring retaining block 13 is limited solely to an up and down reciprocal movement, rotational movebent being prevented by engagement of an enlarged portion 20 of the screws 15 in elongated slots 21.

As the tool guide assembly 10 and tool 11 approach the work object the tool guide bushing 18 contacts the upper surface of the work or a work jig and is retained thereby. Further downward motion of the drive spindle 12 moves the tool 11 through the bushing and into the work, with the tool guide bushing 18 remaining at the surface thereof. As the tool guide bushing rests on the surface and the tool moves downwardly therein, the guide bushing retainer 14 is pushed upwardly relative to the block 13, the shoulder screws 15 sliding in the elongated slots 21. Springs 16 are compressed, urging the tool guide bushing 18 toward its downward position. As the tool guide assembly reaches the limit of its stroke, portion 22 of guide bushing retainer 14 contacts the shoulder screw 15 and downward motion is stopped.

To return the tool and drive spindle to its beginning position, the tool 11 is retracted from the work. As this operation takes place, spring 16 holds the guide bushing retainer 14 and the tool guide bushing 18 down on the work surface. Shoulder screws 15 slide in slots 21 until portion 22 is met. This then places the guide bushing retainer 14 at its beginning position in relation to the spring retaining block 13, and as the tool guide assembly 10 and tool 11 are further retracted the tool guide bushing 18 separates from the work surface with the tool 11 fully covered.

By this operation, the tool is supported along its entire length either by the tool guide bushing or the work at all times during the work stroke, and any vibration or wobble of the tool is eliminated. This permits highly accurate work to be performed within close tolerance limits.

I claim:

1. A tool guide assembly to fit around a drive spindle and tool, comprising: a spring retaining block affixed to said drive spindle by a plurality of shoulder screws, a guide bushing retainer having a pluralty of elongated longitudinal slots therein mounted for reciprocal movement in said spring retaining block, means including said shoulder screws to limit said movement, a plurality of springs urging the guide bushing retainer apart from the spring retaining block, and a tool guide bushing affixed to said guide bushing retainer to substantially completely house the tool when the guide bushing retainer is apart from the spring retaining block.

2. A tool guide assembly to fit around a drive spindle and tool, comprising: a spring retaining block affixed to said drive spindle by a plurality of shoulder screws, a guide bushing retainer mounted for reciprocal movement in said spring retaining block, means including said shoulder screws to limit said movement, a plurality of springs urging the guide bushing retainer apart from the spring retaining block, and a tool guide bushing affixed to said guide bushing retainer to substantially completely house the tool when the guide bushing retainer is apart from the spring retaining block.

3. A tool guide assembly to fit around a drive spindle and tool, comprising: a spring retaining means, means for affixing said spring retaining means to said drive spindle, a guide bushing retainer movably mounted for axial movement only in said spring retaining means, means for limiting the axial movement of said guide bushing retainer in said spring retaining means including said means for affixing said spring retaining means to said drive spindle, a plurality of springs urging the guide bushing retainer from the spring retaining means, and a tool guide bushing affixed to said guide bushing retainer, the guide bushing retainer and tool guide bushing forming a sheath around the tool, said guide bushing retainer, tool guide bushing, and tool being axially movable as a unit, and said plurality of springs allowing the axial motion of the sheath to be stopped while further axial movement of the tool is continued.

4. A tool guide assembly for a standard spindle extension having a tubular end portion with means for releasably rigidly attaching a tool shank therein, comprising: a cylindrical tubular tool guide bushing having a substantial length slidable on a substantial length of the tool shank adjacent the end thereof; a tubular guide bushing retainer having a substantial length slidable on a substantial length of said spindle extension end; means releasably rigidly attaching the tool guide bushing to the guide bushing retainer; a spring retainer having a portion surrounding said guide bushing retainer; means for releasably rigidly attaching the spring retainer to the spindle extension end; means restraining the guide bushing retainer against rotation relative to the spindle extension end and guiding the guide bushing retainer to slide longitudinally on the spindle extension end; and compression spring means around the axis of the spindle extension end having one end bearing against said spring retainer and one end bearing against said guide bushing retainer adjacent the tool guide bushing for urging the guide bushing retainer longitudinally relative to the spring retainer.

5. A tool guide assembly for a standard spindle extension having a tubular end portion with means for releasably rigidly securing a tool shank therein, comprising: a cylindrical tubular tool guide bushing slidable on the tool shank; a tubular guide bushing retainer slidable on said spindle extension end; means releasably rigidly attaching the tool guide bushing to the guide bushing retainer; a spring retainer having a portion surrounding said guide bushing retainer and an aperture providing access to the tool securing means; means for releasably rigidly attaching the spring retainer to the spindle extension end; means restraining the guide bushing retainer against rotation relative to the spindle extension end and guiding the guide bushing retainer to slide longitudinally on the spindle extension end; and a plurality of compression springs spaced angularly around the axis of the spindle extension end, each having one end bearing against said spring retainer and one end bearing against said guide bushing retainer for urging the latter longitudinally relative to the former.

References Cited in the file of this patent

UNITED STATES PATENTS

| 1,471,137 | Bowman | Oct. 16, 1923 |
| 2,224,480 | Kartarik | Dec. 10, 1940 |
| 2,296,087 | Burns | Sept. 15, 1942 |
| 2,792,726 | Vick | May 21, 1957 |

FOREIGN PATENTS

| 105,992 | Sweden | Nov. 24, 1942 |